FIG·1.

June 3, 1930.     A. J. LAVOIE     1,761,043
VEHICLE BRAKE
Filed July 7, 1924     7 Sheets-Sheet 2

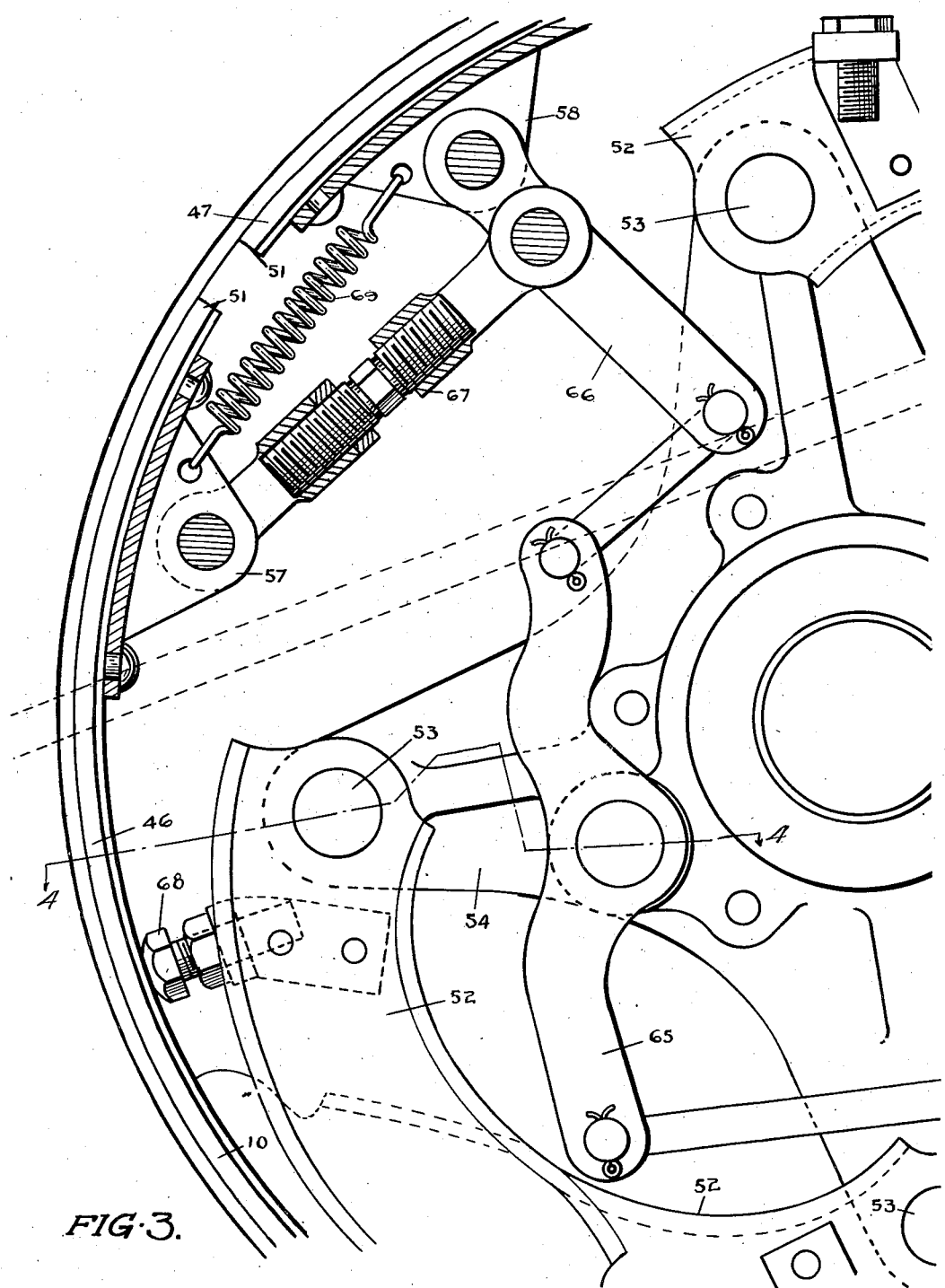

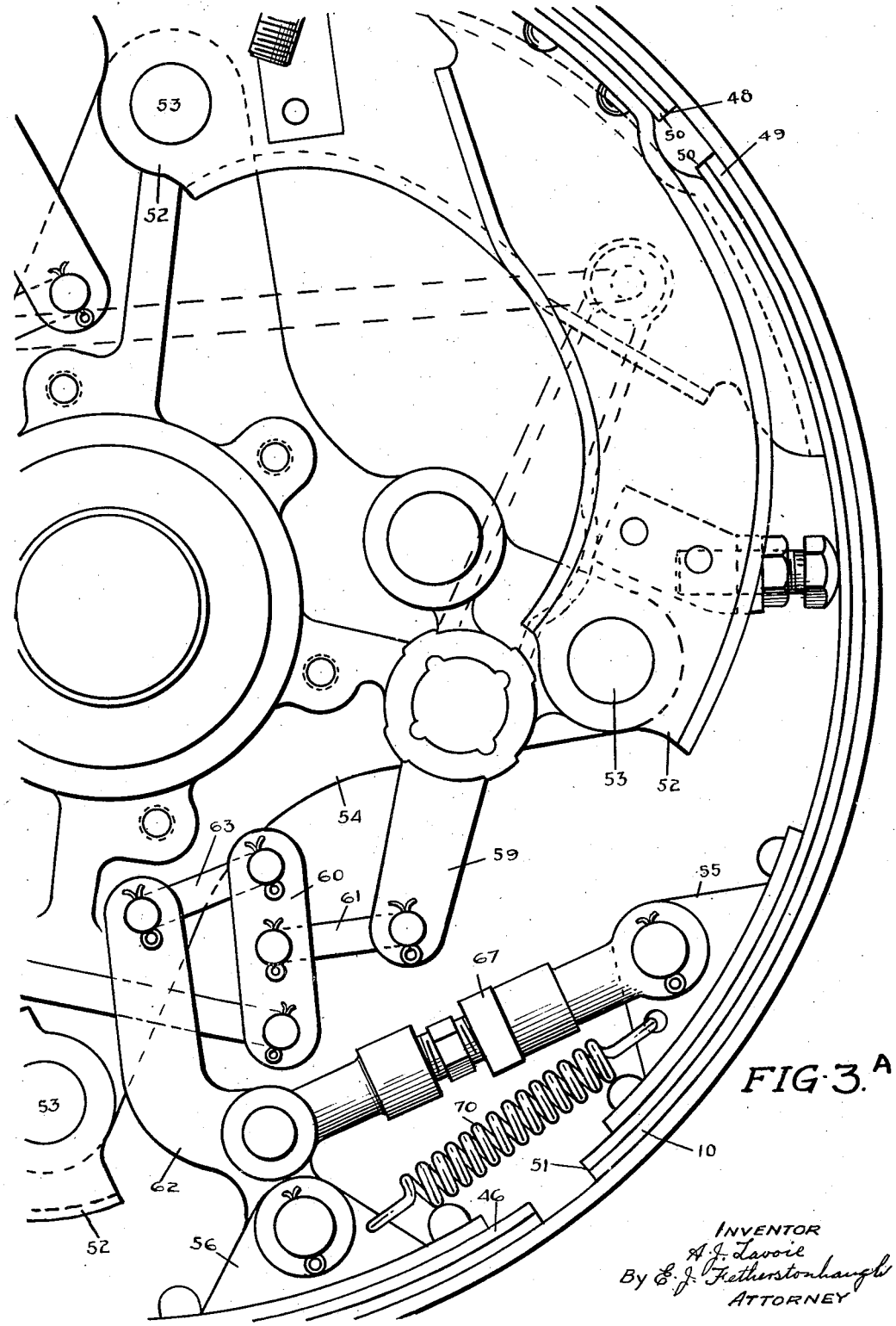

June 3, 1930. A. J. LAVOIE 1,761,043
VEHICLE BRAKE
Filed July 7, 1924 7 Sheets-Sheet 5

INVENTOR
A. J. Lavoie
By E. J. Featherstonhaugh
ATTORNEY

June 3, 1930. A. J. LAVOIE 1,761,043
VEHICLE BRAKE
Filed July 7, 1924 7 Sheets-Sheet 6
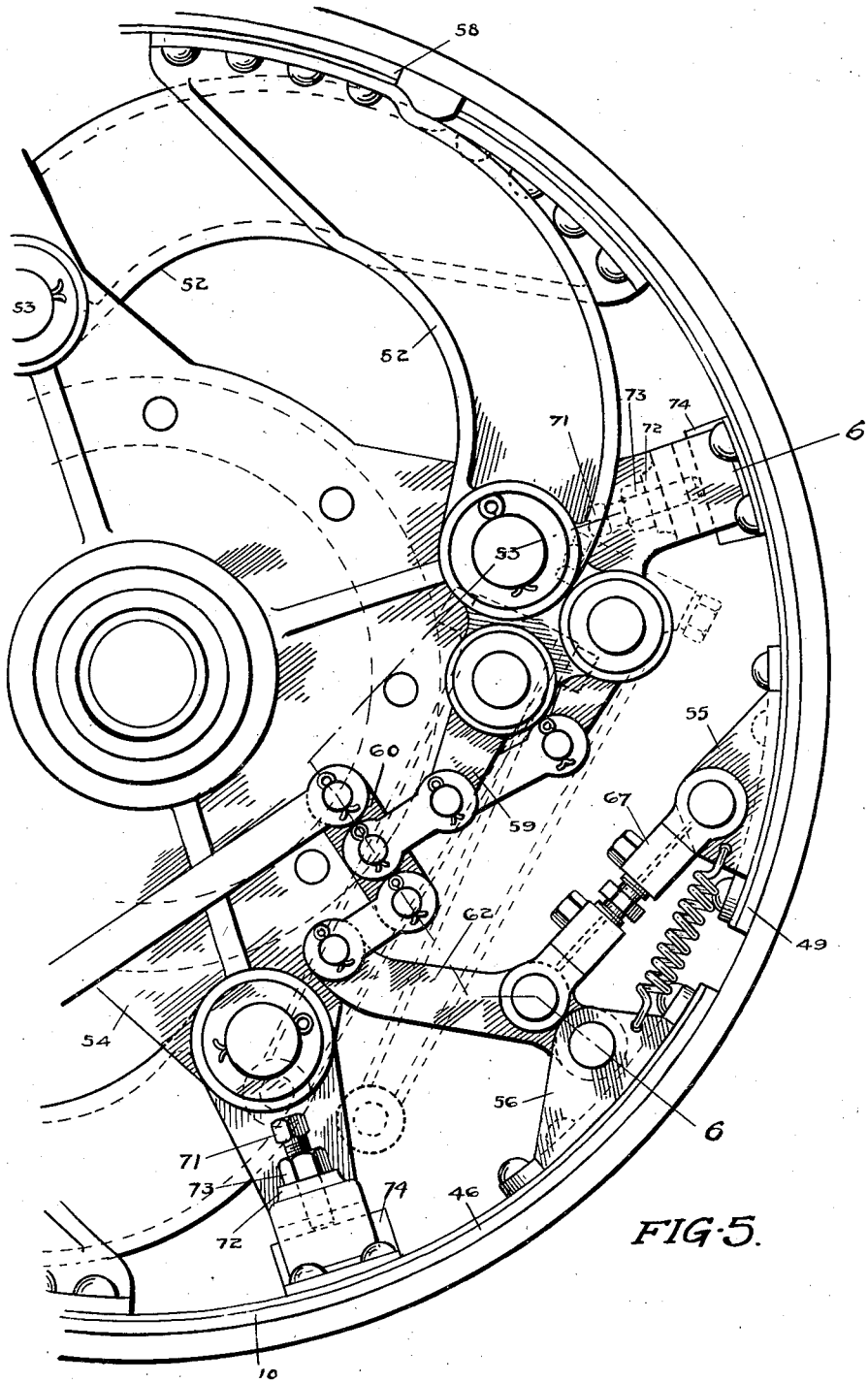
FIG·5.
INVENTOR
A. J. Lavoie
By E. J. Fetherstonhaugh
ATTORNEY

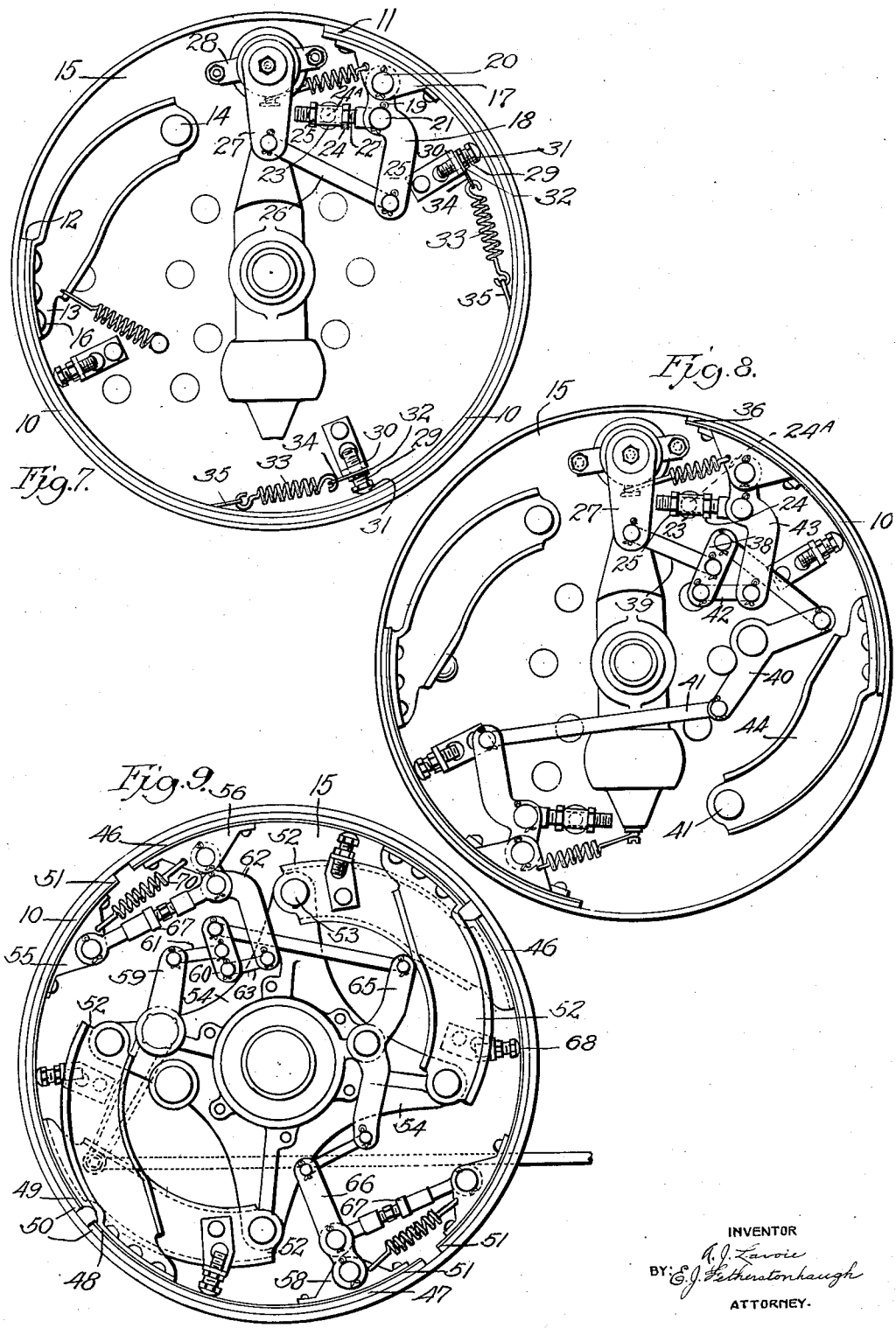

Patented June 3, 1930

1,761,043

UNITED STATES PATENT OFFICE

ALPHONSE JOSEPH LAVOIE, OF MONTREAL, QUEBEC, CANADA

VEHICLE BRAKE

Application filed July 7, 1924. Serial No. 724,552.

The invention relates to vehicle brakes as described in the present specifications and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to insure a close and even application of each contact member with the drum, thereby eliminating the bad effects of heavier pressure of one part than the other; to enjoy all the benefits derived from both shoe and band brake constructions; to maintain the proper clearance between contact member and drum throughout the length of said member; to effect the maximum pressure with a minimum movement of the operating part and with small exertion of force in the application of the brakes; to utilize as far as possible conventional devices in regard to the parts affected in order to enable a more universal adaptation of the brakes to the many different constructions in vehicles; and generally to provide in brake operating mechanisms, ease of application, smoothness of action, efficiency, durability and serviceability as well as eliminating, rattling, chattering and self locking in order to make the brake one hundred percent effective.

In the drawings Figure 1 is an end view of the brake operating mechanism as applied to the front wheels showing a single contact member.

Figure 3 is a fragmentary view showing in particular a plan of the operating parts and adjusting mechanism in a four shoe brake.

Figure 3ª is a fragmentary view showing a plan of the operation mechanism on the right hand side as opposed to the brake operating mechanism shown in figure three on the left hand side.

Figure 4:
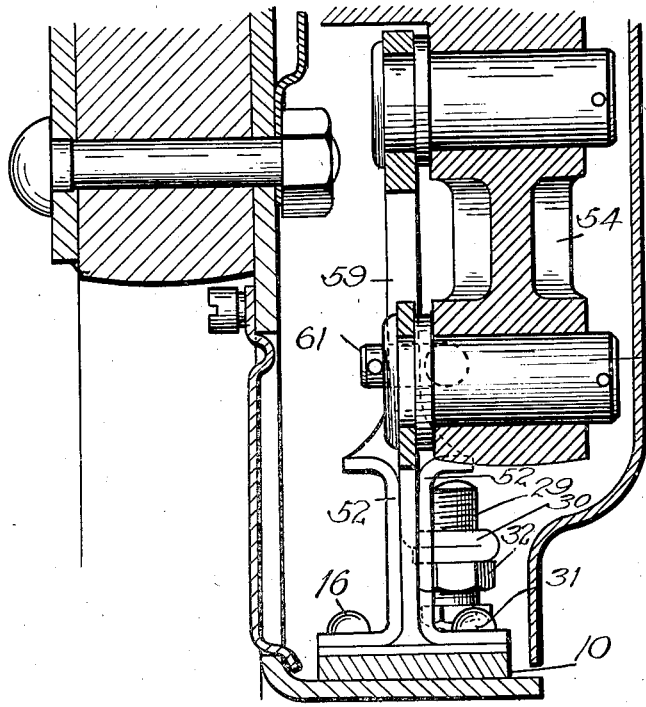

Figure 4 is a vertical sectional view of the construction illustrated in Figure 3.

Figure 5 is a plan view of the double opposed balanced type of brake operating mechanism adaptable to rear wheel construction having two independent sets of brakes on rear wheels.

Figure 6:
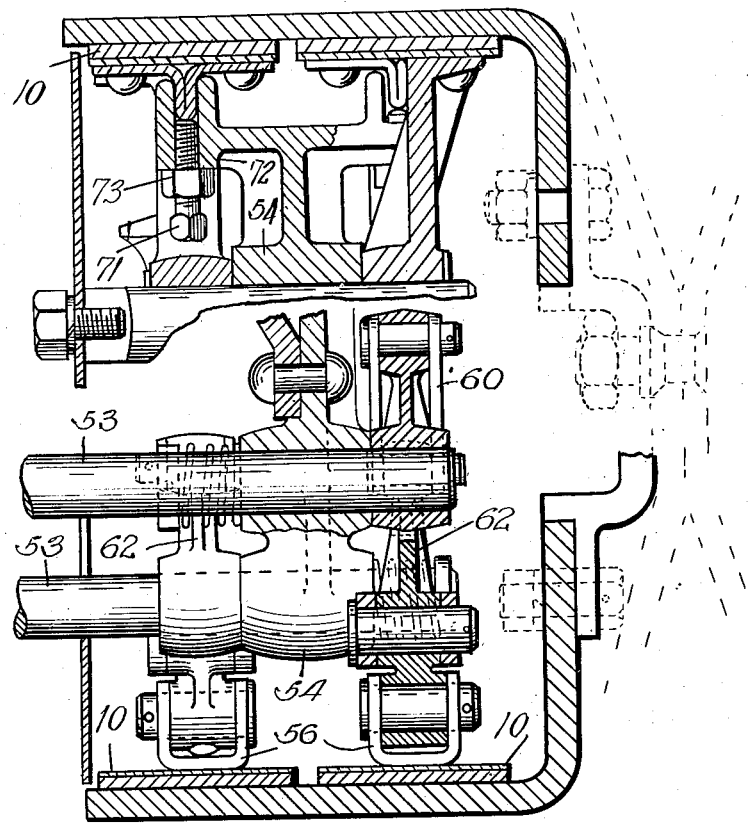

Figure 6 is a vertical sectional view of the form of the invention illustrated in Figure 5.

Figure 7 is a view of the brake operating mechanism within the drum showing the application of the invention to one shoe.

Figure 8 is a view of the brake operating mechanism as applied to two shoes.

Figure 9 is a view of the brake operating mechanism as applied to four shoes.

Like numerals of reference indicate corresponding parts in the various figures.

Figure 1:
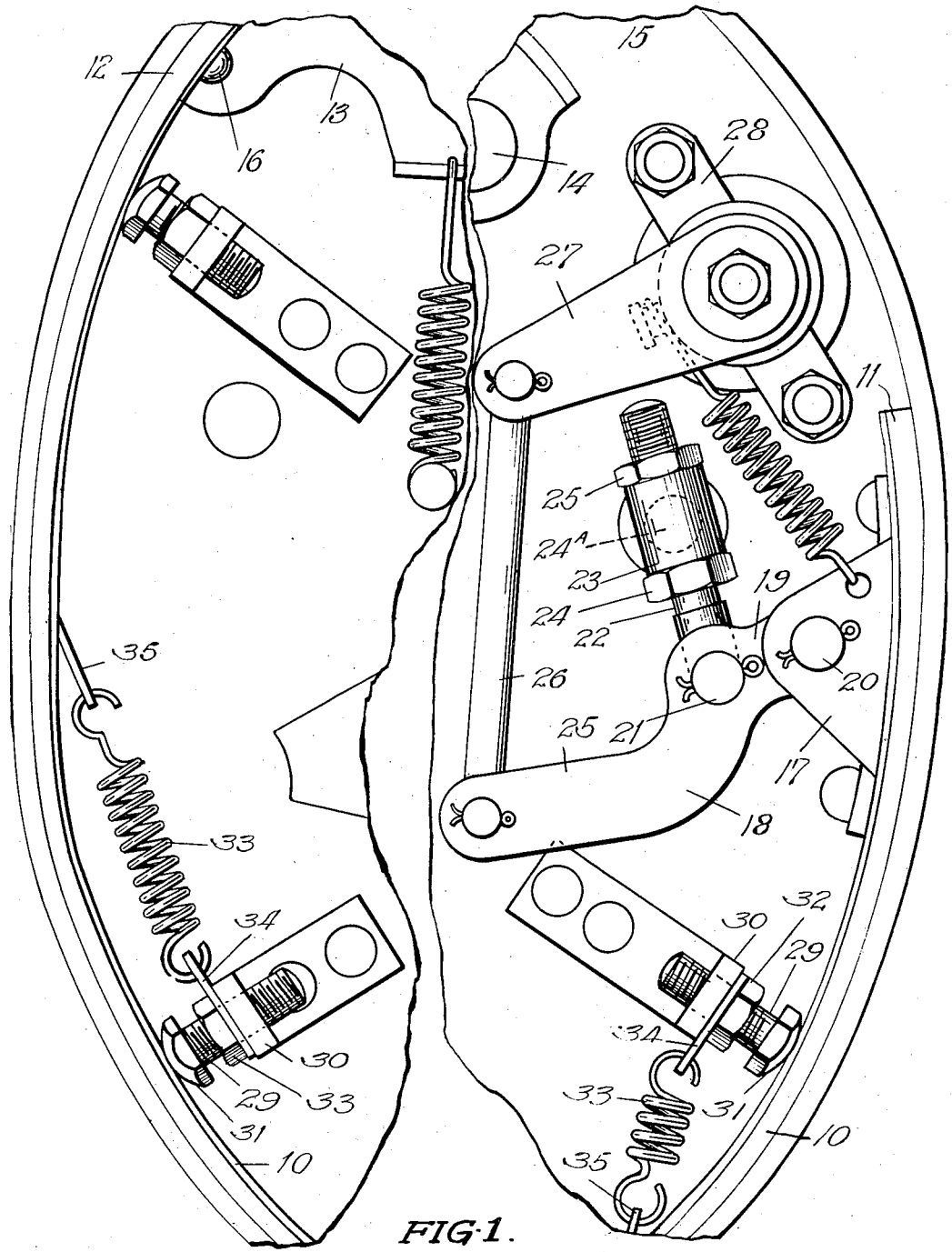

Referring to the drawings, the contact member in Figure 1 is made in the form of a band 10 in shoe form at the ends 11 and 12. At the end 12 the arm 13 forms the shoe anchorage and is secured by the pivot 14 in the brake carrier 15, said arm being secured by the rivets 16 to the end 12 of said band 10.

The other end 11 of the band 10 carries a shoe body 17 forming a pivot lug for the pivotal mounting of the arm 18, the short offset leg 19 of this arm being secured in said lug or body 17 by the pivot 20, while the arm at the angle of the offset is mounted on the pivot 21, extending outwardly and laterally from the end of the threaded adjusting pin 22. The pin 22 is inserted through the oscillatory barrel 23 and held in its adjusted position by the nuts 24 and 25.

The barrel 23 is mounted on the pivot 24ª secured in the brake carrier 15.

The long leg 25 of the arm 18 is pivotally connected by the rod 26 to the brake operating lever 27 journalled in the bearing bracket 28 rigidly secured to the brake carrier 15.

The clearance adjusting screws 29 are screwed into the blocks 30 riveted to the brake carrier 15 and the rounded heads 31 of these screws form stops at intervals against the inner side of the band 10 and when the adjustment is satisfactory regarding the clearance between stops and drum the screws 29 are locked by the nuts 32. The springs 33 are in tension between the lugs 35 secured to the contact member at intervals and the lugs 34 from the brake carrier 15.

It will now be seen that by turning the operating lever 27 by means of suitable rod connections the arm 18 is turned on its self adjusting pivot 21 and this tends to move the shoe body 17 in the direction of rotation of the drum and as the other end of the band 10 is fixed by the pivoted shoe arm from circumferential movement, the band throughout its length must wrap itself to the drum which has the desired effect of braking the speed of the drum and consequently of the vehicle wheel and vehicle.

Figure 2:
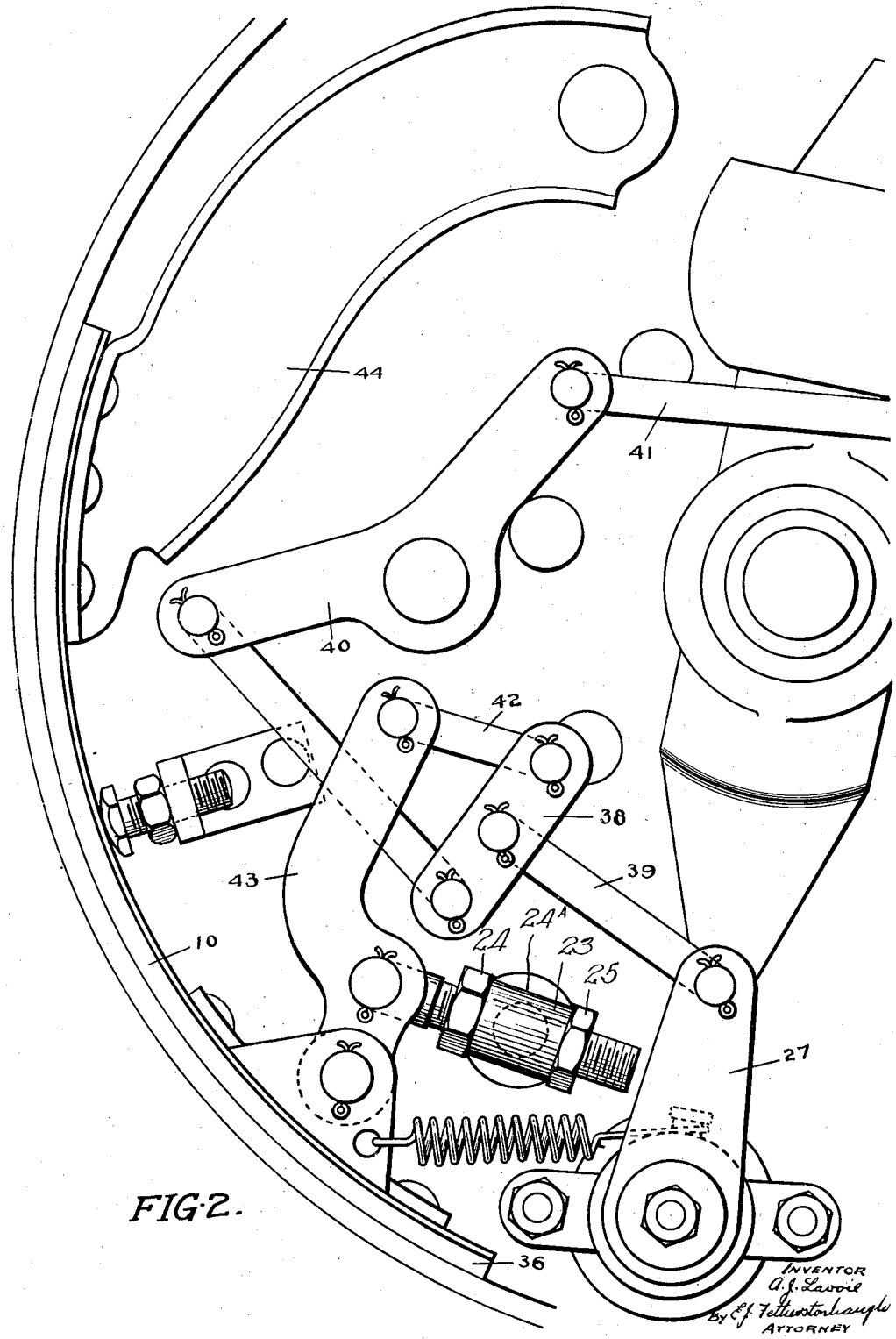
Figure 2 is an end view of the same mechanism as illustrated in Figure 1 showing two opposite balanced contact members.

In Figure 2 the construction is almost identical with that described in explaining the parts in Figure 1 and the only differences are the balanced type of contact members illustrated in the shoe 36 adapted to engage opposite sides of the drum, thereby making it necessary to add to the mechanism the equalizing bar 38 pivotally and centrally joined to the operating lever 27 by the connector bar 39, said equalizing bar 38 being at one end pivotally connected to the rocker arm 40, which in turn is pivotally connected to the lever link 41. The other end of the equalizing bar 38 is pivotally connected by the bar 42 to the arm 43 and as the band 36 is pivotally anchored to the arms 44 at its other end the operation to bring these bands or contact members into engagement with the drum is precisely the same as hereinbefore described, though the member of clearance stops and relief springs is modified in this balanced construction.

In Figures 3 and 3ᵃ the contact members 46, 47, 48 and 49 are steel bands with shoe ends 50 and 51 connected through the shoe arms 52, pivoted at 53 in the brake carrier 54 and in adjoining shoes crossing one another, and the shoe bodies or lugs 55, 56, 57 and 58. Both shoe arms and shoe lugs are securely riveted to the bands at the ends 50 and 51 respectively.

The operating lever 59 is connected to two of the shoe lugs through the equalizer bar 60 to which it is pivotally connected by the link 61. One end of said bar is joined to the long leg of the offset lever 62 by the pivoted bar 63 and this lever 62 is joined at its short leg to the shoe lug 56. The other end of the equalizer bar 60 is connected by a bar to one end of the rocker arm 65, while the other end of said rocker arm is joined by a connecting bar to the long leg of the arm 66, pivotally secured to the shoe lug 58 at its short leg.

The turnbuckles 67 join the shoe lug 55 and lever 62 and shoe lug 57 and arm 66, thereby operatively connecting the operating lever 59 with all the shoes, though adjoining band brakes are applied to the drum in opposite directions.

The clearance adjusting screws 68 in this rear wheel brake operating mechanism are the same as already described.

The relief springs 69 and 70 are connected to adjoining shoes and as it has been explained that adjoining shoes are applied in opposite directions, naturally the pulling of the shoes towards one another will effect their release.

In Figure 5 a modification of the clearance adjusting screw is shown. The set screw 71 is screwed into the boss 72 and locked in position by one nut 73 and the end of the screw 71 engages a contact member 74 adapted to engage the brake band.

In the operating of these brakes generally it will be noticed that the application of the bands in service is always in the direction of rotation of the drum, while the remaining shoe bands simply rub and further that in applying the band it gathers or wraps itself on the drum in the direction of the shoe arm pivot, thus it cannot very well present any one surface for rubbing without the remainder consequently wearing will be even throughout.

The adjustment of the clearance is done in a very simple manner and the release of the brakes is instantaneous.

The long contact members in their flexibility secure excellent results as they closely adhere to the drum throughout their whole length and as each shoe is anchored independently the moving of the other ends towards the drum makes the bands lie against the drum from end to end.

One of the particular features of this invention is the variable anchorage as the shoe anchorage arms, as the pivots of these arms may be changed to suit the requirements of the weight and class of the vehicle, that is to say, the pivot of each arm may be at different distances from the circumference, nearer or farther from the centre as the case may be, of course once decided upon it is preferably fixed for all time but the position given is extremely important in regard to the application of the brakes.

What I claim is:—

1. In vehicle brakes, a shoe operating lever, a band contact member, an anchorage arm rigidly secured to one end of said band and extending inwardly to a pivot fastening, link bars connecting the aforesaid lever, and the other end of said band, the latter having a pivot bearing rigidly secured thereto for said connection.

2. In vehicle brakes, a shoe contact member swinging from an anchorage arm at one end thereof, a shoe body rigidly secured to the other end of the contact member, a connecting arm pivotally secured in said body, an adjustable pivot carrying said connecting arm intermediately, a main operating lever, a link joining said operating lever and connecting arm, a drum engaged by said shoe and rotating with the vehicle wheel and a non-rotatable brake carrier.

3. In vehicle brakes, a band contact member having a shoe arm riveted thereto and extending inwardly from one end and riveted, a shoe body rigidly secured to the other end, a rocker arm pivotally secured in said body, an adjustable pivot engaging said lever intermediately, a main operating lever, a connecting bar joining said rocker arm and said operating lever, a drum engaged by said band and rotating with the vehicle wheel and a non-rotatable brake carrier.

4. In vehicle brakes, a rotatable drum, a plurality of bands forming contact members in pairs diametrically arranged and having their ends reinforced by rigid metal mountings, a stationary carrier plate, an operating lever and link connections therefrom, inwardly curved anchoring arms extending in opposite directions from contiguous reinforced ends and pivoted to said carrier, rocker arms operating the other ends of said bands and joined to said link connections and an intermediate rocker arm between elements of said link connections.

5. In vehicle brakes, a rotatable drum, a plurality of bands forming contact members in pairs diametrically arranged and having their ends reinforced by rigid metal mountings, a stationary carrier plate, an operating lever and link connections therefrom, inwardly curved anchoring arms extending in opposite directions from contiguous reinforced ends and pivoted to said carrier, a plurality of rocker arms joined to the operating lever by said link connections and applying said bands from the ends, and clearance screws mounted in lugs from the carrier and engaging a contact piece applied to said bands centrally and held by lock nuts.

Signed at Detroit this 29 day of May 1924.

ALPHONSE JOSEPH LAVOIE.